J. F. FOX.
RUNNING GEAR FOR MINE CARS.
APPLICATION FILED APR. 15, 1915.
1,235,305.
Patented July 31, 1917.
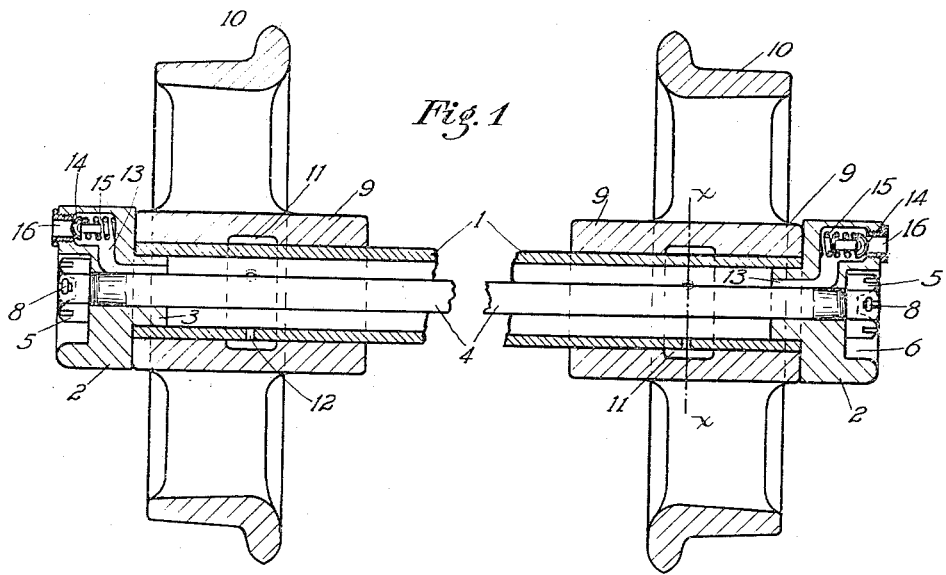
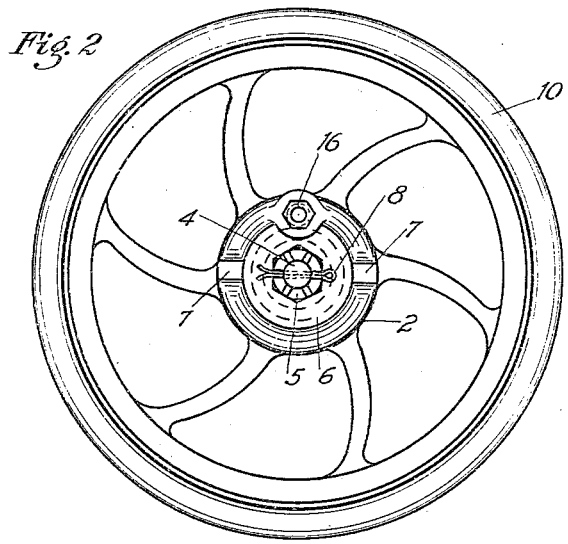
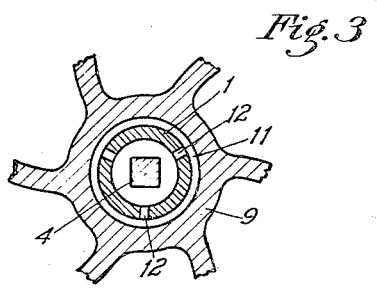
Witness
J. W. Cox
Inventor
John F. Fox

UNITED STATES PATENT OFFICE.

JOHN F. FOX, OF BIRMINGHAM, ALABAMA.

RUNNING-GEAR FOR MINE-CARS.

1,235,305.  Specification of Letters Patent.  Patented July 31, 1917.

Application filed April 15, 1915. Serial No. 21,594.

*To all whom it may concern:*

Be it known that I, JOHN F. Fox, a citizen of the United States of America, residing at Birmingham, in the county of Jefferson and State of Alabama, have invented certain new and useful Improvements in Running-Gear for Mine-Cars, of which the following is a specification.

My invention relates to improvements in running gear for cars and more particularly for mine cars.

My present invention relates to certain improvements in running gear such as is described in my Letters Patent No. 1,068,385, in which I provide a hollow open ended axle which is adapted to be filled with grease or lubricant which is supplied to the wheel bearings, the wheels being held in running position on the axle by a tie rod extending through the axle and through the outer ends of the hubs. Under operating conditions it has been found desirable to detach the end cap to which the tie rod is attached from the wheel itself so that the tie rod will not turn with the wheel but only with the axle. This disconnecting of the end caps from the wheels require a change both in the manner of supplying lubricant to the axle and of delivering lubricant from the axle to the wheel bearings, it being desirable to have oil inlet ducts at a point for convenient charging and to adapt the axle to deliver the lubricant in the most effective manner to the wheel bearing.

With these objects in view my invention comprises the novel arrangement of parts which are hereinafter more particularly described, and which are set forth in the appended claims, reference being had to the accompanying drawings which form a part of this specification, and in which the preferred embodiment only of my invention is illustrated.

Figure 1 of the drawings illustrates the wheel and axles in vertical longitudinal cross section, the axle being broken at its center.

Fig. 2 is an end elevation of Fig. 1; and

Fig. 3 is a vertical cross sectional view on the line 3—3 of Fig. 1.

Similar reference numerals refer to similar parts throughout the drawings.

In the embodiment of my invention illustrated, I show a hollow tubular axle 1 formed preferably of high carbon seamless steel tubing left open at its ends which are closed by removable cast iron plug caps 2 having their inner ends 3 turned and fitted snugly in the ends of the axle so as to prevent the escape of lubricant therefrom. These caps are provided with central squared openings through which the ends of the tie rod 4 projects, this rod passing centrally through the axle 1 and having its intermediate portions squared and its ends rounded and turned to receive the nuts 5. These nuts are received in a seat 6 cast in the outer face of the plug caps 2. The outer rim surrounding this seat 6 is provided with opposite notches 7 to provide for the ready insertion and removal of a cotter key 8 which is inserted through the slots of the nut and through a transverse hole in the end of the tie rod. These plug caps 2 have their inner faces turned smooth and it will be noted that they project sufficiently above the outer circumference of the axle to form an outer end retaining bearing for the hubs 9 of the wheels 10. The wheels will have the customary axial play on their bearings to provide for track irregularities. I provide at the middle of the bore of each hub an annular groove 11 and opposite this groove the axle is provided with a plurality of grease ports 12, preferably three in number, as seen in Fig. 3, and arranged equi-distantly about the axle. This oil groove 11 is made wide enough to prevent its moving out of register with the ports 12 during the ordinary play of the wheel on the axle. In order to provide for the easy charging of the axle with grease I provide each cap plug with an angled grease port 13 which extends horizontally inward from its outer face and downwardly to the central opening for the tie rod and then along said opening as an enlargement thereof into the hollow axle. In order to keep this port normally closed, I insert a small valve 14 therein having a coiled spring 15 to force it outwardly against a seat formed by a bushing 16 which is screwed into the outer end of the grease port. The ordinary grease gun can have its discharge nozzle inserted in the bushing and it will force the valve open and deliver the grease easily and rapidly into the hollow axle, the other valve being preferably held open so as to provide a free vent for the air during the charging of the grease.

In operation, after the wheels have been assembled on the axle, the plug caps are mounted on the axle with their ends 3 inserted into the open ends of the axle and the caps are tied in position by applying the nuts to the ends of the tie rod and locking them after they have been screwed home. Having charged the axle with grease in the manner described, the car is ready for service and it will be found that there will be a steady and reliable flow of grease through the ports 12 to the groove 11 and from this groove in both directions along the wheel bearing. The flow of the grease from the axle is made positive and effective by the capillary attraction of the bearing and by the suction tendency of the revolving mass of grease in the groove 11 to draw out a gradual supply of grease from the grease filled ports 12. The advantage of having the tie rod squared and fitted into square holes in the cap plugs is that by this means the plugs are prevented from turning about the tie rod and thereby having a tendency to loosen the retaining nuts 5. As stated, the plug caps, tie rods and axles are not normally intended to turn with the wheels but under excessive friction conditions they can turn and in such event the axle, caps and tie rod will all turn together, thus avoiding any relative movement between the caps and the nuts which might tend to loosen the latter.

Having thus described my invention, what I claim as new and desire to secure by Letters Patent, is:—

1. In a running gear for cars, a hollow axle adapted to be filled with lubricant, end plug caps adapted to fit into and close the ends of the axle and to form end retaining bearings for the wheels, a tie rod extending longitudinally through the axle and leaving a free space between the rod and the axle and the rod also extending through the plug caps, means to tie the caps and tie rod against relative rotative movement, wheels mounted on the axle, and openings through the hollow axle to supply lubricant from the hollow axle to the wheel bearing.

2. In a running gear for cars, a hollow axle, metal plugs inserted in the ends of said axle to close the same and having a vertical bearing face to form end retaining means for the wheels, said plugs having each a lubricant admission duct extending longitudinally through them and opening into the hollow axle, and means to close the outer ends of the ducts.

3. In a running gear for cars, a hollow axle, detachable metal plugs inserted in the ends of said axle to close the same and having a vertical bearing face to form end retaining means for the wheels, said plug having squared center openings and having oil ducts extending longitudinally therethrough and opening into the hollow axle, a tie rod which is passed through the axle and having squared ends which are passed through the squared openings of the plugs, means engaging said tie rod to tightly secure the plugs in place in the axle, and means to apply lubricant from the hollow axle to the wheel bearings.

4. In a running gear for cars, a hollow axle, wheels mounted on the ends thereof, means to retain the wheels loosely in running position on the axle independently of each other, and an annular groove in the hub bore near the middle thereof, said axle having a plurality of oil ports therein registering with said groove, substantially as described.

5. In a running gear for cars, a hollow axle adapted to be filled with lubricant, wheels having their hubs mounted to turn loosely on said axle, means to retain the wheels independently in running position on the axle, an annular and axially elongated groove in the bore of each wheel hub equidistant from the ends thereof, said axle having a plurality of equi-distantly spaced oil ports surrounding it at each end and adapted to register with said grooves in the hubs during all running positions of the wheels.

6. In a running gear for cars, a hollow axle, end retaining means for the wheels having plugs adapted to fit snugly into the open ends of the axle and having squared alining center holes therethrough, a tie rod for said plugs which extends through the axle and is squared where it passes through said plugs, said caps having nut receiving seats in their outer faces, nuts therein engaging rounded threaded ends of the tie rod and adapted to hold the plugs, tie rods and axle together for joint rotation while permitting either end plug to be independently removed, means to charge lubricant into the axle, and means to supply lubricant from the axle to the wheel bearings.

7. In a running gear for cars, in combination with an axle, a wheel loosely mounted thereon and comprising a hub having a smooth bore and having at an intermediate point an annular groove which opens only into the bore of the hub for the purpose of lubrication, substantially as described.

8. In a running gear for cars, in combination with a hollow axle, wheels loosely mounted on the ends of said axle, means for holding the wheels thereon independently of each other, said wheels having a hub portion provided with a smooth bore and having at an intermediate point an annular groove which opens into the bore of the hub, for the purpose of lubrication.

9. In a wheel bearing, in combination, an axle having therein an oil reservoir and a plurality of radially and uniformly disposed ports leading from said reservoir through the hub bearing portion of the axle; and a wheel having a hub mounted on said hub bearing portion of the said axle with axial play for the hubs on the axle, there being an annular groove in the hub opening only into the hub bore and disposed to travel always in register with said ports, and means to hold said wheel in running position on said axle with the said groove and ports in register.

10. In a wheel bearing, in combination, an axle having therein an oil reservoir and a plurality of ports leading from said reservoir through a hub bearing portion of the axle and all disposed in a common plane passing vertically through and at right angles to said axle; and a wheel having a hub mounted to turn on said axle bearing portion, there being an annular shallow groove in the hub opening only into the hub bore and having a width lengthwise of the axle substantially greater than the diameter of said ports, said groove being disposed substantially at the middle of the hub bore, and means to hold said wheel hub in running position on said axle to provide for axial play with its groove traveling always over said ports.

11. In a wheel bearing, in combination, an axle having therein an oil reservoir and a plurality of radially and uniformly disposed ports leading from said reservoir through the hub bearing portion of the axle; and a wheel having a hub mounted on said hub bearing portion of the said axle with axial play for the hubs on the axle, there being an annular groove in the hub opening into the bore thereof and disposed in a plane parallel with the plane of rotation of the wheel, said groove being adapted to collect and hold a body of lubricant under centrifugal pressure when the wheel is in operation, substantially as described.

12. In a wheel bearing, in combination, an axle having therein an oil reservoir and a plurality of radially and uniformly disposed ports leading from said reservoir through the hub bearing portion of the axle; and a wheel having a hub mounted on said hub bearing portion of the said axle with axial play for the hubs on the axle, there being an annular groove in the hub opening into the bore thereof and disposed in a plane parallel with the plane of rotation of the wheel, said groove being closed, except for said oil ports, by the bearing surfaces lubricated.

In testimony whereof I affix my signature in presence of a witness.

JOHN F. FOX.

Witness:
NOMIE WELSH.